July 26, 1927.
J. L. DROHEN
VEHICLE CURTAIN
Filed May 8, 1926
1,637,297
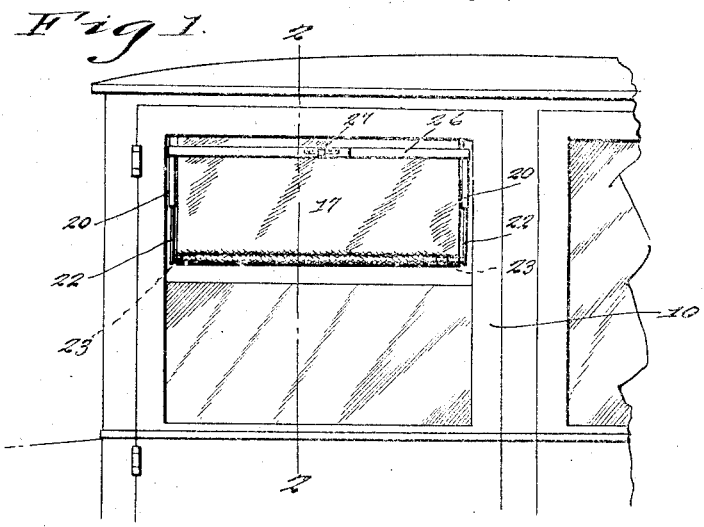
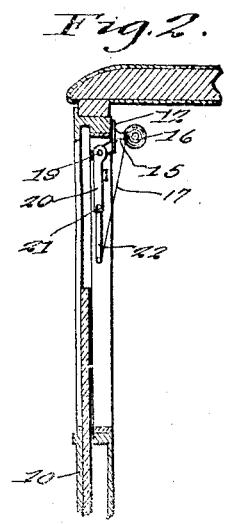
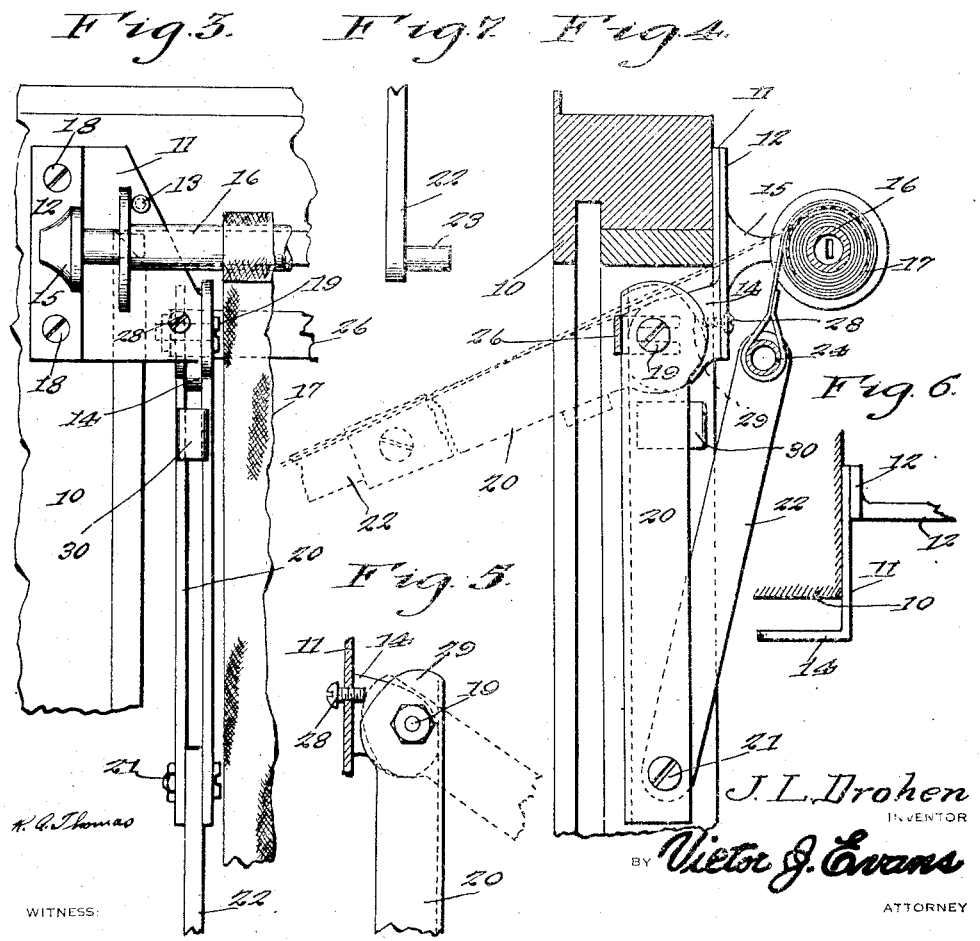
J. L. Drohen
INVENTOR
BY Victor J. Evans
ATTORNEY Patented July 26, 1927.

1,637,297

UNITED STATES PATENT OFFICE.

JAMES L. DROHEN, OF DUNKIRK, NEW YORK.

VEHICLE CURTAIN.

Application filed May 8, 1926. Serial No. 107,771.

This invention relates to vehicle attachments or accessories and is an improvement upon the construction disclosed in Patent No. 1,580,023, granted to me April 6, 1926.

Like the device referred to, my present invention aims to provide a curtain or shade which may be attached to an automobile window for the protection and comfort of the occupants. The present invention however aims to improve the device disclosed in my former application by simplifying the attaching means and making the device foldable, so as to more conveniently arrange the same either when in or out of use. Further, the construction and arrangement is such that the curtain may be utilized for holding the supporting frame in its adjusted position.

With the above and other objects in view, the invention further includes the following novel features and details of construction, to be hereinafter more fully described, illustrated in the accompanying drawings and pointed out in the appended claim.

In the drawings:—

Figure 1 is an elevation showing a fragmentary portion of the body of an automobile with the invention applied.

Figure 2 is a section on the line 2—2 of Figure 1.

Figure 3 is a fragmentary plan view looking at the inner face of the automobile window.

Figure 4 is a fragmentary vertical section showing the attachment folded.

Figure 5 is an enlarged fragmentary section illustrating the pivotal connection between the curtain frame and its supporting brackets.

Figure 6 is a fragmentary view of the outer end of one of the side bars of the frame.

Figure 7 is a detail end view of the roller supporting arm of the bracket.

Referring to the drawings in detail wherein like characters of reference denote corresponding parts, the reference character 10 indicates a portion of the frame of a vehicle window, to which is secured a pair of supporting brackets. These brackets are of sectional formation and each includes an under section or attaching plate 11 and an upper section 12. The plate 11 is adapted to extend vertically upon the inner face of the frame 10 and is provided with an opening for the passage of a nail or other type of attaching device 13. The lower end of the plate 11 has extending therefrom a right angularly disposed arm 14 which extends outwardly with respect to the window frame.

The section 12 of each of the brackets has extending therefrom a bearing arm 15 which is designed to support a spring roller 16, whose tendency is to wind thereon a curtain 17. The bracket section 12 is provided with openings for the passage of screws or other fastening devices 18 and the latter pass through openings or slots provided in the plate 11 of the under bracket section.

Pivotally secured to the arms 14 as shown at 19, is a substantially U-shaped frame which includes side arms of sectional formation. The inner sections 20 of these arms have pivotally secured to their outer ends as shown at 21, the inner ends of outer arm sections 22, while the latter have extending laterally from their outer ends, studs 23. Engageable over these studs is a rod 24 which may be of sectional telescopic construction so that it may be adjusted to the width of the window. The inner arm sections 20 are transversely U-shaped and the sections 22 are pivotally secured and foldable within these inner arm sections and limit relative pivotal movement of the arm sections in one direction. The upper ends of the inner arm sections 20 are connected by a sectional bar 26 whose adjacent ends are adjustably connected as at 27 to accommodate the frame to the width of the window. This acts to stabilize the frame and permits the same to be regulated in accordance with different windows. The outer edge of the curtain is secured around the bar 24.

The curtain may be either extended straight downward as shown in Figure 1 of the drawings, or extended outward as shown by the dotted lines in Figure 4. In the last named position, an adjustable stop 28 which is carried by the plate 11, engages a head 29 at the inner end of each section 20. In this position, the tension of the curtain will act to hold the frame extended. The inner arm sections are provided with bumpers 30 which are arranged to prevent contact of the arms with the window glass when the latter is raised and the arms extended.

The invention is susceptible of various changes in its form, proportions and minor details of construction and the right is herein reserved to make such changes as properly fall within the scope of the appended claim.

Having described the invention what is claimed is:—

A vehicle attachment comprising a pair of brackets adapted to be secured to the frame of a vehicle window, said brackets each comprising a vertically disposed attaching portion, a roller supporting arm secured to and extending at right angles from its upper end and an outwardly extending horizontal arm extending from its inner end, a spring roller mounted in the roller supporting arms, a substantially U-shaped frame including side arms, means pivotally securing the side arms to the horizontal arms of the brackets, bracket carried adjustable stops extending from the vertical arms and engaging the side arms to limit pivotal movement of said side arms in one direction, stops carried by the side arms to limit pivotal movement of the side arms in opposite directions and a curtain wound upon the roller and having its outer end secured to the frame, whereby the frame may be extended outward in unfolded position and maintained in such position by the tension of the curtain, or arranged in folded position and held in such position by the curtain.

In testimony whereof I affix my signature.

JAMES L. DROHEN.